Sept. 28, 1954   J. L. CHYNOWETH   2,689,982
METHOD OF AVOIDING DISTORTION IN SYNTHETIC
RESIN SHEET MANUFACTURE
Filed April 23, 1951
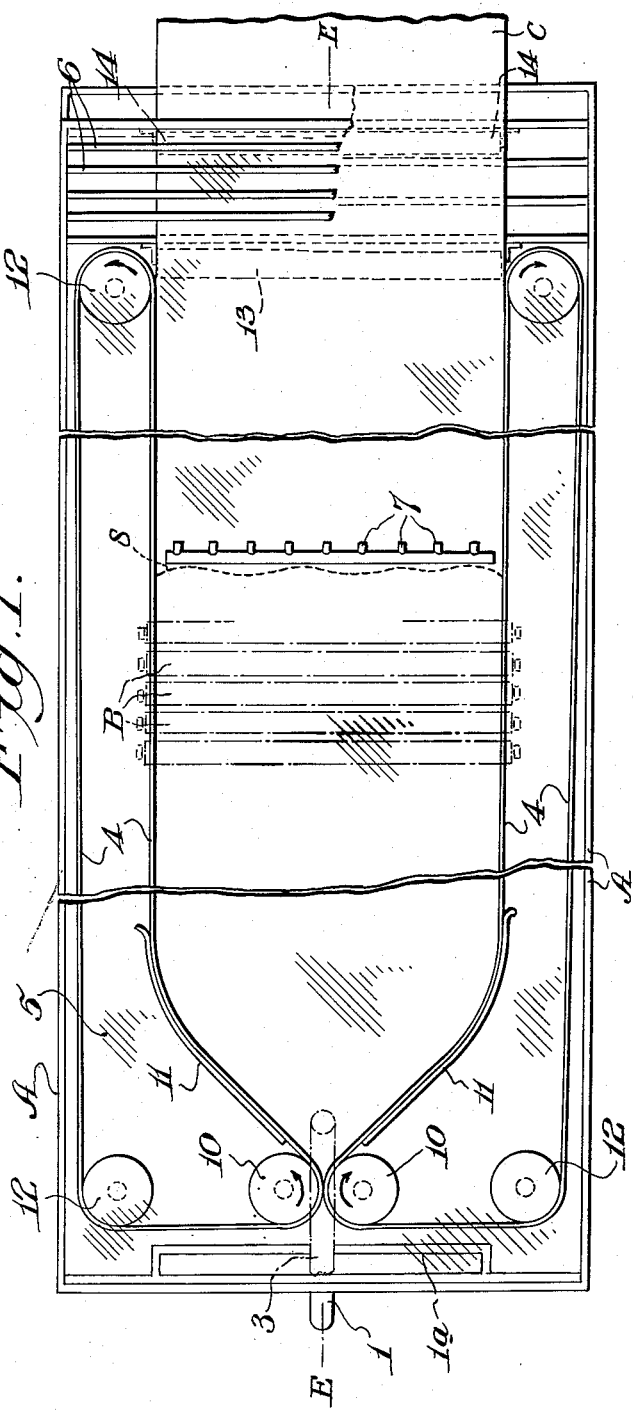
INVENTOR.
John L. Chynoweth
BY
ATTORNEY.

Patented Sept. 28, 1954

2,689,982

UNITED STATES PATENT OFFICE 2,689,982

METHOD OF AVOIDING DISTORTION IN SYNTHETIC RESIN SHEET MANUFACTURE

John L. Chynoweth, Wilmington, Del., assignor to E. I. du Pont de Nemours and Company, Wilmington, Del., a corporation of Delaware Application April 23, 1951, Serial No. 222,459

2 Claims. (Cl. 18—57)

This invention relates to the preparation of synthetic resin sheets and more particularly to a continuous process of casting methyl methacrylate sheets.

The R. T. Fields U. S. Patent 2,537,970, issued January 16, 1951, describes a process of polymerizing methyl methacrylate by distributing the monomeric ester, usually containing some polymer, upon the surface of a body of an aqueous salt solution which is substantially saturated at operating temperatures. The process is carried out by initiating the polymerization of the monomeric ester with actinic energy although thermal energy may be used if temperatures are maintained below 80° C. Clear polymeric sheets of polymethyl methacrylate, polystyrene, etc., are produced when aqueous solutions of the preferred salts, such as magnesium chloride and lithium chloride, are used. The Fields process is a long step in advance over previous techniques of producing polymeric sheeting such as that described in the Rohm et al. U. S. Patent 2,154,639, in which polymerization is carried out in molds or cells composed of two sheets of glass separated by a compressible gasket. By following the process of the Fields patent supra and the process disclosed in the instant case, superior polymeric resin sheet of optical quality may be obtained.

In carrying out the general Fields process of continuously preparing sheets of polymeric methyl methacrylate and other polymers, a number of problems have been encountered in producing imperfection-free sheets and especially optically perfect sheets. It was found that during polymerization of the organic compound, contact of that compound with stationary solid surfaces could not be tolerated. Moreover, the upper exposed surface of the sheet of polymerizing organic compound must polymerize at substantially the same rate as the lower surface thereof and should not, it has been found, be in contact with substances that inhibit polymerization.

An object of the present invention is to provide a process of preparing synthetic resin sheets of substantially optical clarity. Another object is to provide a process of distributing a liquid polymerizable organic compound upon the surface of a moving body of an aqueous salt solution in a uniform and continuous manner. A further object is to provide a method of eliminating, during the polymerization of methyl methacrylate sheeting, causes of optical distortion. Other objects and advantages of the invention will hereinafter appear.

The invention relates in general to the polymerization of a monomeric organic compound by distributing a compound as a liquid layer on the surface of a body of an aqueous salt solution and thereafter polymerizing the compound at a temperature between 0 and 80° C., the aqueous salt solution being maintained between −20° C. and 80° C., being substantially saturated with a salt at said temperature and having a specific gravity at least as great as the polymer being formed. The polymerization process is conducted, in accord with the invention, by continuously distributing the liquid polymerizable organic compound upon the surface of a moving body of an aqueous salt solution while confining the liquid compound by means of a moving barrier, by carrying out the polymerization in a closed system, by passing an inert gas on the exposed upper surface area of the sheeting during polymerization, and by maintaining a suitable polymerization inhibitor in the aqueous salt solution.

The above and other objects of the invention will be more readily understood by reference to the drawings which diagrammatically illustrate a form of apparatus that may be used and by reference to the examples illustrating preferred embodiments of the invention.

Figure 1 is a diagrammatical plan view of an apparatus for carrying out the invention in which retaining belts are shown for confining the distribution of the organic compound on the surface of the salt solution.

Figure 2 is a section E—E of the apparatus shown in Figure 1.

The apparatus shown in Figures 1 and 2 comprises in combination tray A of Monel metal or other suitable corrosion-resisting metal into which is introduced an aqueous salt solution through inlet 1, the solution flowing continuously over weir 1a into tray A and overflowing continuously over the dam 1b being discharged through pipe 2. A syrup of monomeric and polymeric methyl methacrylate is poured upon the surface of the aqueous salt solution through inlet pipe 3. Syrup-retaining barrels, such as belts 4, fabricated from polytetrafluoroethylene, or other suitable material, retain the syrup upon the surface of the aqueous salt solution, the syrup moving concurrently with the barrier and the aqueous salt solution. A bank of fluorescent lights B, producing light of maximum intensity at approximately 3600 Angstroms wave length, is suspended above the casting unit and serves as the source of energy for initiating polymerization. Upon substantial completion of polymerization, the finished sheet C is continuously withdrawn from the unit. The entire unit is closed to the atmosphere by covering the top of the casting tray with glass 5 or other suitable material, and the end of the unit, where the sheet is withdrawn, is sealed from the atmosphere by flaps 6 of rubber or other suitable flexible material which act as the exit seal. Prior to operation of the unit, the air in space D is replaced with nitrogen, or other inert gas, and during polymerization the inert gas is introduced into the sealed unit through header 7, the gas flowing over the substantially completely polymerized portion of the sheet to reduce the concentration of methyl methacrylate vapor. The gas leaves the unit through the exit seal under flaps 6.

The barrier used for restricting the lateral flow of the polymerizing resin on the concentrated salt solution may be a vertically disposed flexible belt, link belt or any other suitable retaining means. As shown in Figure 1, two endless belts are used, the belts being advanced at the desired rate by driven pulleys 10, operated by a power source not shown. The belts are moved through a path in front of the Monel metal guides 11 and around idling pulleys 12. The monomer-polymer syrup flows over the salt solution, forms a layer confined by the belt 4, advances at substantially the same rate as the belt, polymerizes as it advances and as the polymerized sheet leaves the tray and the support of the salt solution held therein, it passes over idler rolls 13 and 14 and above the rubber exit flexible walls 16.

The dotted line 8 in Figure 1 illustrates the approximate dividing line between substantially completely polymerized material and the polymerizing mass of material. It is important for optimum results, for reasons described hereinafter, that the inert gas be introduced into the unit at a point immediately beyond this dividing line on the side of the polymerized portion, the gas flowing in the direction designated by the arrows 9 and passing out of the unit around or under flaps 6. Since the up-stream end of the unit is sealed from the atmosphere, a sustantially stagnant space of inert gas and vapors of the polymerizable liquid is maintained over the liquid portion of the polymerizing mass. Hence, by introducing the inert gas into the unit at a point immediately beyond the dividing line between the polymerizing mass and the substantially solid polymerized sheet, the gas flows over the solid sheet to reduce the concentration of vapor of the polymerizable liquid in the inert gas.

It is important that the inert gas be introduced immediately beyond the division between the polymerizing mass and the substantially solid polymerized sheet so that the flow of gas is toward the exit end of the unit. If the gas were permitted to flow over the entire length of the unit, that is over both the liquid polymerizing mass and the substantially solid portion of the sheet, the current of gas would promote evaporation of liquid polymerizable material from the liquid polymerizing mass. Moreover, such evaporation would disrupt the homogeneity of the polymerizable liquid, especially when a syrup of polymer dissolved in monomer is used, and this would result in the production of sheeting having optical distortions. Furthermore, if an inert gas were permitted to flow over the entire length of the unit, evaporation of polymerizable liquid into the gas would saturate the gas with vapor of polymerizable liquid, and this saturated atmosphere would cause pitting of the polymerized sheet at the exit end of the unit. Hence, an inert substantially stagnant atmosphere is maintained above the upper surface of the polymerizing mass, permitting the inert gas to flow only across the upper surface of the substantially polymerized sheet.

The following example illustrates embodiments of the invention in which parts are by weight unless otherwise stated.

An aqueous solution of magnesium chloride was prepared, saturated at about 10° C., and having a specific gravity of about 1.3 at that temperature. Sodium nitrite was added to the solution, the quantity being sufficient to produce a concentration of about 0.001%, based upon the total weight of the aqueous magnesium chloride solution. The resulting solution was poured into a Monel metal tray 5' wide by 28' long by 6" deep, until the solution rose to a depth of about 1½".

A syrup of about 85% methyl methacrylate monomer and about 15% of its polymer by weight, having a viscosity of about 15 poises and containing about 0.8% of water, based upon the weight of syrup, and containing 0.3% of alpha,alpha'-azodiisobutyronitrile, based upon the weight of syrup, was poured on the salt solution through nozzle 3a. If desired, a syrup containing greater or lesser amounts of the polymer dissolved in the monomeric ester may be used and with careful control of polymerization temperature, pure monomer can be used. A pair of retaining belts, 0.05 inch in thickness by 3 inches in width, fabricated from polytetrafluoroethylene, were arranged in a position similar to that shown in Figure 2, immersed in the salt solution to a depth of about 1½" and mounted with angle of divergence being about 90°. The belts, however, may diverge at an angle between 45° and 180° although the preferred angle is between 80° and 100°. These belts, spaced 52" apart, were moved co-directionally at about 7' per hour with the syrup as it advanced with the salt solution, the belts retaining the syrup on the surface of the salt solution so that a sheet of about 50" in width was formed. The methyl methacrylate syrup was distributed onto the surface of magnesium chloride solution at the rate of about 190 cc. per minute from nozzle 3a having an inside diameter of about ⅛". The point of distribution of the syrup onto the salt solution was on the center line between syrup-retaining belts at a point 3" from the point of divergence of the belts. The salt solution was circulated concurrently with the syrup at about 7' per hour and was cooled and filtered in a continuous fashion. Under the foregoing conditions a polymeric sheet, having a thickness of about ⅛", was formed.

The glass covering 5 of the Monel metal tray A permitted the maintenance of an atmosphere of nitrogen above the surface of the polymerizing mass. A glass, or other transparent material, that does not absorb unduly ultraviolet light should, of course, be used, for the light bank B above cover A is used to induce polymerization of the monomeric ester. A stream of nitrogen, at the rate of from 5 to 25 liters and preferably about 15 liters per minute, was passed over the polymerized portion of the sheet from a point 4' from the end of the unit, while the salt solution was maintained at a temperature of about 15° C. by a cooling jacket, not shown, beneath the tray. The inlet temperature of the syrup was about 15° C., and during polymerization the temperature of the polymerizing layer rose to a maximum of about 40° C. As the source of polymerization energy, a bank of BL-360 lights, producing light of maximum intensity at approximately 3600 Angstroms wave length, was suspended above the casting tray. Upon emerging from the irradiated zone the polymerized methyl methacrylate sheet was substantially completely polymerized. The sheeting produced was of particularly high clarity with smooth surfaces and was free of bubbles. The sheeting was classified as optical quality.

The example was repeated except that a stagnant atmosphere of nitrogen was maintained over the entire upper surface of the polymerizing mass. The resulting sheeting, however, was found to be highly pitted. The methyl methacrylate vapor in the stagnant atmosphere attacks the solid sheeting and appears to be responsible for the pitting. When such sheeting is subsequently heat treated, pitting is highly accentuated and the resulting sheet has a frosted appearance. Plasticized sheeting is more vulnerable to pitting than is unplasticized sheeting but regardless of composition of the sheet produced, surface pitting is eliminated entirely by passing an inert gas, such as nitrogen, over the sheeting as described.

Distribution of the polymerizable liquid should be carried out in such a manner that at the time the syrup contacts the retaining means the linear speed of each should be substantially the same. At the point of syrup distribution the syrup moves rapidly and in all directions across the surface of the salt solution, seeking its ultimate level. The linear speed of the syrup at the point of distribution is about 60-100 times the linear speed of the retaining belts. Enough space should be provided to permit the syrup to level out and gradually slow down to approximately the linear speed of the retaining belts before actually contacting the belts. Accordingly, it has been found that the point of syrup distribution should be sufficiently removed from the syrup retaining belts to insure that the syrup during polymerization, at least, will be moving at approximately the same linear speed as the retaining belts at the time of contact. It follows that the closer the point of distribution to the syrup retaining belts, the greater the difference between the linear speed of the retaining belts and the adjacent portions of syrup, and the greater the shearing forces between the retaining belts and the adjacent portions of syrup. The degree of shear between the retaining belts and syrup determines the number and intensity of longitudinal lines which are formed in the polymerized sheeting. Depending on the intensity of the lines they may or may not be detectable by visual inspection. In most cases these lines are only detectable by observing a shadow pattern of the sheeting.

In general it is preferred to distribute the polymerizable liquid at a point on the center line between the retaining belts. As described above, this point must not be too close to either of them. On the other hand, the point of distribution should not be too far removed from the point of divergence of the belts, otherwise the polymerizable liquid between the point of distribution and the point of divergence of the belts will tend to stagnate. This would result in syrup hold-up and generally would cause non-uniform polymerization. Experience has shown that the point of distribution should be no closer than about 2″ from the point of divergence of the retaining belt and no greater than about 12″ therefrom. Furthermore, the point of distribution does not have to be on the center line between the retaining belts so long as it is not too close to a retaining belt. In general, it is preferred that the point of distribution be between 3 to 6 inches from the point of divergence of the belts and on the approximate center line between the belts. Combined with the optimum angle of divergence of the belts, distribution of the polymerizable liquid, preferably in a single stream, at the optimum point results in the formation of optical quality sheeting.

Although operation within the optimum conditions of the present invention produces polymeric sheeting, especially methyl methacrylate and styrene sheeting, of highest optical quality, the so-called optical imperfections in the sheeting produced by operation outside of the optimum conditions are usually not apparent by visual inspection. This means that sheeting not classified as optical sheeting can be used for various applications, such as a diffusing means in fluorescent lighting, painted signs, electroplating tanks, and in various ornamental applications such as handbag and umbrella handles, lamp stands, display stands, etc. Optical sheeting, which is used in aircraft enclosures, lenses, etc., may be judged by observing a shadow pattern of the sheeting.

The flow of polymerizable liquid onto the surface of the aqueous salt solution depends upon the general dimensions of sheet to be formed, that is length, width and thickness. Furthermore, the linear velocity rate of the retaining belts and flow of aqueous salt solution will be balanced with the flow of polymerizable liquid. These variables are adjusted to optimum values depending upon the production rate, the dimensions of the sheeting and general conditions of polymerization. For optimum results the forward movement of the sheet of polymerizing ester, the flow of supporting salt solution and the advance of the belts are synchronized to the same rate of travel which may vary widely. In operating in equipment of the size described, speeds between 5 and 10 feet per hour can be used.

Any inert gas, that is not an inhibitor of polymerization, and which is inert toward the liquid polymerizable organic compound and the resulting polymer thereof, may be used in area D in the process. Besides nitrogen, other inert gases which may be used include helium, neon, argon, etc.

As stated, it is very important that the inert gas be restricted to passing over the upper surface of the substantially solid polymerized sheet. The atmosphere of the inert gas mixed with the vapor of the liquid polymerizable organic compound that stands above the liquid polymerizing mass should be substantially stagnant so that vaporization of the liquid polymerizable material is held to a minimum. This is accomplished by first introducing the inert gas into the unit by means of a perforated tube 7 with discharge openings pointing in the direction of the sheet exit of the unit. Since there is no other outlet for the gas at the inlet end of the unit, inert gas flow is maintained in the direction of the sheet exit. In addition to the proper direction of flow, it is also important that the rate of flow of the gas is not excessive. This should be adjusted in accordance with the general dimensions of the polymerization unit. An excessive rate of flow will tend to cause excessive evaporation of liquid polymerizable compound in the polymerization portion of the unit, resulting in the formation of optical irregularities in the resulting sheeting. On the other hand, a very low rate of vapor flow will be ineffectual in preventing pitting of the sheeting because of the higher concentration of monomeric vapors present.

The invention is particularly useful as applied to the production of methyl methacrylate polymer or styrene polymer sheets, but may be used for the production of sheets on any liquid polymerizable compound. Mixtures of methyl methacrylate or styrene with other polymerizable compounds in lesser proportions may be substituted for the methyl methacrylate or styrene monomers or syrup. Other polymerizable liquids, such as methyl, ethyl, propyl and butyl acrylates and ethacrylates, ethyl, propyl and butyl methacrylates, vinyl chloride, vinylidene chloride, methyl styrene, and the like, are examples of other ethylenically unsaturated compounds to which the process is fully applicable, although sheets of such polymerizable compounds are not in great demand.

I claim:

1. In a process for the preparation of methyl methacrylate polymer sheeting wherein a layer of monomeric and polymeric methyl methacrylate syrup is poured on a moving substantially horizontal surface of an aqueous liquid saturated with a salt, the ester being polymerized thereon to form a sheet, the layer of ester and the salt solution moving co-directionally through an enclosed chamber, the steps which comprise introducing an inert gas into the enclosed chamber at a position removed from the place at which the monomeric and polymeric methyl methacrylate syrup is poured on the moving surface of the saturated salt solution and beyond the division between the polymerizing mass of syrup and the substantially solid polymerized sheet, maintaining a stagnant vapor in the space above the syrup and a flow of the inert gas in the space above the solid polymerized sheet, whereby optical distortion of the polymeric methyl methacrylate sheet is inhibited.

2. The process of claim 1 in which the inert gas is selected from the group consisting of nitrogen, helium, neon and argon.

References Cited in the file of this patent

UNITED STATES PATENTS

| Number | Name | Date |
|---|---|---|
| 2,345,013 | Soday | Mar. 28, 1944 |
| 2,537,970 | Fields | Jan. 16, 1951 |
| 2,579,138 | Burness et al. | Dec. 18, 1951 |